United States Patent [19]

Rushforth et al.

[11] 3,860,446

[45] Jan. 14, 1974

[54] TREATMENT OF KERATINOUS FIBRES AND FABRICS

[75] Inventors: Michael Rushforth, Raistrick; Kenneth Winterbottom, Whittlesford, both of England

[73] Assignees: Ciba-Geigy AG, Basle, Switzerland; I.W.S. Nominee Company Limited, London, England

[22] Filed: Mar. 5, 1973

[21] Appl. No.: 338,004

Related U.S. Application Data

[63] Continuation of Ser. No. 78,286, Oct. 5, 1970, abandoned.

[30] Foreign Application Priority Data

Oct. 8, 1969 Great Britain ............... 49542/69

[52] U.S. Cl. ............... 117/141, 8/127.5, 8/128 R, 8/128 A, 117/139.5 CQ, 117/139.5 A, 260/79.1
[51] Int. Cl. ............... D06m 3/06, D06m 13/28
[58] Field of Search ............ 8/127.5, 128 R, 128 A; 260/79.1; 117/141, 139.5 A

[56] References Cited
UNITED STATES PATENTS

| | | | |
|---|---|---|---|
| 2,126,818 | 8/1938 | Sager et al. ............... | 260/79.1 X |
| 2,140,063 | 12/1938 | Talalay ............... | 260/79.1 X |
| 2,206,643 | 7/1940 | Patrick ............... | 260/79.1 X |
| 2,836,972 | 6/1958 | Cranker et al. ............... | 260/79.1 X |
| 2,933,418 | 4/1960 | Dogliotti et al. ............... | 260/79.1 |
| R19,207 | 6/1934 | Patrick ............... | 260/79.1 |

OTHER PUBLICATIONS

Jorczak et al., Polysulfide Liquid Polymers, Industrial and Engineering Chemistry, Vol. 43, Feb. 1951, pages 324–328.

"Thiokol," Synthetic Rubber Coating Materials, Pub. by Thiokol Corp. of Yardville, New Jersey, Rec. Sept. 23, 1935.

*Primary Examiner*—Mayer Weinblatt
*Assistant Examiner*—Dennis L. Albrecht
*Attorney, Agent, or Firm*—Joseph G. Kolodny; Edward McC. Roberts; Probodh I. Almaula

[57] ABSTRACT

A process for modifying keratinous material, and, in particular for rendering the material resistant to shrinkage and for imparting durable press characteristics to the material is provided. The material is treated with a polysuflide of the formula

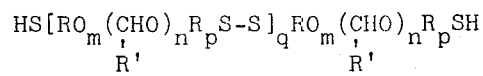

in which R is alkylene, R' hydrogen, methyl or ethyl, $q$ at least 1 and either $m$ is zero, when $n$ and $p$ each are also zero or $m$ is 1, when $n$ is zero or 1 and $p$ is 1. Afterwards the polysulfide is cured on the material.

8 Claims, No Drawings

TREATMENT OF KERATINOUS FIBRES AND FABRICS

This is a continuation of application Ser. No. 78,286, filed on Oct. 5, 1970 now abandoned.

The present invention relates to a process for modifying kerantinous material, and, in particular, to a process for rendering the material resistant to shrinkage and to a process for imparting durable press characteristics to the material.

A number of shrink-resist processes for keratinous material are known, some of which comprise the application of a resin to the material which may be in fabric or fibre form. Shrink-resist processes stabilize the dimensions of keratinous materials against shrinkage due to felting.

Durable press processes for keratinous material are also known and many of them employ resins the same or similar to those used in shrink-resist processes. In some durable press processes the desired shape is imparted to the keratinous material before the resin is cured and then curing is allowed to take place whilst the material is maintained in the desired shape, e.g. in form of creases or pleats. In others the resin is applied after the desired shape is imparted to the material. Durable press processes stabilize the shape and surface smoothness of the material against the effects of agitation in the presence of aqueous solutions. The desired shape may be imparted to the material before or after resin treatment by well known methods involving the use of setting agents such as water, reducing agents, and bases.

A desirable, though not essential, feature of shrink-resist and durable press processes is that the keratinous material so treated should be washable in domestic washing machines. To be machine-washable the finish on the treated material should withstand vigorous agitation in warm or hot water containing detergents, and this requirement sets a severe test for the durable press and shrink-resist treatments.

One of the attractions of keratinous fibres and particularly wool is their excellent handle, and an important disadvantage associated with many of the resins used in shrink-resist and durable press processes is the harsh handle imparted to the fibre and fabric containing the fibres. Attempts to overcome this harsh handle have been made by the use of softeners, but these have often been unsuccessful in that they reduce the effectiveness of the resin.

We have now found that certain thiol-terminated polysulphides can be used in durable press and shrink-resist processes successfully and do not impart an unattractive handle to the treated material. These polysulphides cure, i.e. undergo reaction, on the keratinous fibre and we have further found that the rate of curing may be largely controlled by selection of the appropriate catalyst.

Accordingly, the present invention provides a process for modifying keratinous material which comprises 1. treating the material with a polysulphide which is substantially of the formula

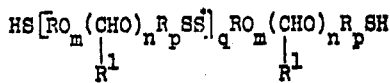

I where

R denotes an alkylene hydrocarbon group containing from two to four carbon atoms, $R^1$ denotes hydrogen, methyl or ethyl, $q$ is an integer which has an average value of at least 1, and either $m$ is zero, in which case $n$ and $p$ are each also zero, or $m$ is 1, in which case $n$ is zero or 1 and $p$ is 1, and 2. curing the polysulphide on the material.

This invention also provides keratinous fibrous materials, in the form of fabrics if desired, bearing thereon a polysulphide as aforesaid in the cured or still curable state.

The treatment according to the invention, whether to achieve shrink-resist or durable press results, provides fibre or garments which will withstand washing in machines and still retain their original dimensions and shape. In addition to the excellent handle obtained from material treated in accordance with the invention, the treated material also has good recovery from wrinkling, which is an important attribute in fabrics employed in trousers where there is a strong tendency to wrinkles in the areas of the knee and back of the knee. Of course, wrinkle-resistance is an important advantage in many garments.

The thiol-terminated polysulphides used in the process according to the invention, as well as inhibiting or preventing felting shrinkage, also inhibit or prevent relaxation shrinkage, which is an important problem associated with knitted goods, and thus the process of the invention finds particular application in the shrink-resist treatment of knitted goods.

The term 'kerantinous material' as used throughout this specification includes all forms of keratinous fibres or fabrics and garments made therefrom, e.g. fleeces, loose wool, tops, card sliver, slubbing, noils, yarns in hanks or in packages, threads, pile fabrics, non-woven fabrics, woven fabrics and knitted goods. In most cases the treatment will be applied to fabrics or made-up garments though it is quite feasible, and may be desirable in some circumstances, to shrink-resist fibres, e.g. in the form of tops. The material to be treated can consist either wholly of keratinous fibres or of blends of these fibres with synthetic fibrous and filamentary material such as polyamides, polyesters, and poly(acrylonitrile), and with cellulosic and regenerated cellulosic material. In general, however, the material should contain at least 30% by weight of keratinous fibres and better results are obtained with 100% keratinous fibre-containing material.

The keratinous material may be virgin or reclaimed: preferably, though not necessarily, it is sheep's wool. It may also be derived from alpaca, cashmere, mohair, vicuna, guanaco, camel hair, and llama, or blends of these materials with sheep's wool.

Thiol-terminated polysulphide resins such as are used in the process of this invention are described by Berenbaum and Panek in *High Polymers*, Volume XIII, Part III, *Polyalkylene Sulfides and other Polythioethers*, ed. Gaylord, Interscience Publishers, 1962, pp. 43 to 114, and 115 to 224. Many are available from the Thiokol Chemical Corporation, under the designations "Thiokol" LP-2, LP-3, LP-31, LP-32, LP-33, LP-8, and LP-205. They are prepared by reaction of an alkylene dihalide, usually a bis(chloroalkyl) ether such as bis(2-chloroethyl) ether or bis(4-chlorobutyl) ether, or better the corresponding formals, with a sodium polysulphide, followed by reductive scission to form a thiol-terminated polymer. In place of the formal, an acetal or propional may be used. As is explained by Berenbaum and Panek, a small proportion, about 0.5 to 2 molar percent, of an alkane trihalide or tetrahalide such as a trichloropropane is included in the reaction with the alkylene dihalide to increase the number of thiol groups per average molecule of the polymer.

Polysulphides of formula I preferred for the purposes of this invention are those having an average molecular weight of at least 500 and at most 8000, particularly of at least 3000 and at most 5000. Especially preferred are the polysulphides conforming to formula I in which R denotes —$CH_2CH_2$—, $R^1$ denotes hydrogen, and $m$, $n$, and $p$ each denote 1.

The polysulphides may be used alone or in association with other resins or resin-forming materials. These may be aminoplasts; other polymeric polymercaptans; epoxy resins (i.e. substances containing on average more than one 1,2-epoxide group per molecule); acrylic resins, including polymers and copolymers of acrylate esters, e.g. ethyl, n-butyl and 2-hydroxyethyl acrylates, and acrylamide; or polyisocyanates, including prepolymers of, for example, a polyoxyalkylene glycol and an aromatic diisocyanate or of a poly(oxyalkylene) triol and an aliphatic diisocyanate.

Amongst polymercaptans which can be applied in conjunction with the polysulphides in the process of this invention are polythiol esters of formula

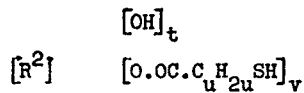

in which $R^2$ represents an aliphatic radical containing at least 2 carbon atoms, and is preferably a hydrocarbon radical containing up to 6 carbon atoms, $v$ denotes an integer of at least 2 and at most 6, $t$ denotes zero or a positive integer such that $(t + v)$ is at most 6, and $u$ denotes a positive integer of at most 2.

Many of these polysulphides are insoluble in water but can be applied as aqueous dispersions or emulsions. Preferably the polysulphides are applied to fabrics and garments from organic solvents, for example lower ketones such as ethyl methyl ketone, benzene, and halogenated hydrocarbon solvents, especially chlorinated and/or fluorinated hydrocarbons containing not more than three carbon atoms such as the dry cleaning solvents, carbon tetrachloride, trichloroethylene, and perchloroethylene.

The amount of the polysulphides used depends on the effect desired. For most purposes from 0.5 to 15% by weight based on the material treated is preferred. Stabilization of knitted fabrics usually requires from 1 to 10% by weight of the resin. A high level of shrink-resistance, crease-setting, and substantial resistance to wrinkling can be achieved on woven fabrics with rather smaller quantities, especially from 1 to 5% by weight. The hand or handle of the treated material will, of course, depend on the amount of polysulphide employed and by simple experiment the least amount of polysulphide required to give the desired effect may readily be determined. Further, the construction of fabric also influences the amount of polysulphide required.

The desired effects are not fully obtainable until substantially all the polysulphide on the material has cured. At ordinary temperatures this may take from 5 to 10 days or even longer. The curing or "fixing" reaction can, however, be accelerated greatly by the use of a catalyst, and generally it is preferred to add the catalyst to the material to be treated at the same time as the polysulphide is applied although it may be added before or afterwards if desired. The curing time can be controlled by selecting an appropriate catalyst and the choice of curing time will depend on the particular application of the process according to the invention.

The catalysts may be organic or inorganic bases, siccatives, oxidative curing agents, and free-radical catalysts such as azodiisobutyronitrile, peroxides and hydroperoxides, or combinations of these. As organic bases there may be used primary or secondary amines, especially the lower alkanolamines, e.g. mono- and diethanolamine, and lower polyamines, e.g. ethylenediamine, diethylenetriamine, triethylenetetramine, tetraethylenepentamine, propane-1,2-diamine, propane-1,3-diamine, and hexamethylenediamine. As inorganic bases there may be used the water-soluble oxides and hydroxides, e.g. sodium hydroxide, and also ammonia, which may be in gaseous form. Examples of suitable siccatives are calcium, copper, iron, lead, cerium, and cobalt naphthenates. Examples of peroxides and hydroperoxides which may be used are cumene hydroperoxide, tert.-butyl hydroperoxide, dicumyl peroxide, dilauryl peroxide, methyl ethyl ketone peroxide, diisopropyl peroxydicarbonate, and chlorobenzoyl peroxide. Other types of catalysts include sulphur, and sulphur-containing organic compounds in which the sulphur is not exclusively present in mercaptan groups, namely, mercaptobenzothiazoles or derivatives thereof, dithiocarbamates, thiuram sulphides, thioureas, dialkyl, dicycloalkyl or diaralkyl disulphides, alkyl xanthogen disulphides, and alkyl xanthates.

The fibres and fabrics are preferably treated at a pH greater than 7, typically 7.5 to 12: under acid conditions the polysulphides tend to cure more slowly.

The amount of catalyst used can vary widely. However, in general from 0.1 to 20%, preferably 1 to 10%, by weight based on the weight of polysulphide used is required, although much larger quantities can be used. Curing of the polysulphide is also assisted by using elevated temperatures and if especially quick results are required then temperatures in the range 30° to 180°C may be used. High humidities also tend to accelerate curing in the presence of catalysts.

The polysulphide, and the catalyst if desired, can be applied to the keratinous material in conventional ways. For example, where wool tops or fabrics is to be treated, it may be impregnated by padding or by immersing in a bath. If garments or garment pieces are to be treated then it is convenient to spray them with the polysulphide, and more convenient still to tumble the garments in a solution of polysulphide. For the latter method a dry-cleaning machine is a particularly useful apparatus for carrying out the process.

If a shrink-resist treatment is required, then it is usually more convenient to apply the polysulphide to the fabric although, as previously stated, it may be applied to the fibres in the form of tops or card sliver. The fabric may be 'flat-set' before or after treatment with the polysulphide and by this means the fabric will, in addition to retaining substantially its original dimensions, also retain its flat smooth appearance during wear and after washing. It should be stated, however, that flat-setting may not be necessary or even desirable with certain types of cloth. Flat-setting is normally carried out either by treating the cloth with steam at superatmospheric pressure, or by treating the cloth with steam at atmospheric pressure in the presence of a setting agent and moisture, and maintaining the cloth in a flat state. Flat-setting may also be achieved by applying high concentrations of a reducing agent and a swelling agent, and maintaining the cloth in a flat state during washing off the excess reagents. In another method flat-setting may be achieved by impregnating the material with a swelling agent and an alkanolamine carbonate, e.g. urea and diethanolamine carbonate, drying the material and then semi-decatising it. Of course, if desired, the fabric may be set in the presence of the polysulphide, thus effecting setting and shrinkproofing treatments simultaneously.

If a durable press treatment is required, there are a number of ways this may be effected. One method is to treat the material with the polysulphide, make the material up into garments or garment pieces, and set it in the desired configuration, e.g. inserting therein pleats or creases, using reducing agents, bases, or superheated steam as setting agents. Again, the polysulphide may be applied to the fibres at any stage during the manufacture of the fabric, e.g. in top form, in yarn, or in fabric form. If desired, agents which block the thiol groups of the wool, e.g. formaldehyde or higher aldehydes, may be applied to the treated garments after curing the polysulphide.

A preferred method of applying the polysulphide to obtain a durable press effect comprises treating the made-up garment or garment piece, which is already set in the desired configuration, e.g. has creases or pleats imparted thereto, with the polysulphide dissolved in an organic solvent. In this method it is essential that the polysulphide is applied in an organic solvent because treatment with aqueous systems would only serve to remove creases or pleats already set in the fabric. An alternative method comprises impregnating the fabric with the polysulphide, in the area where a fold, such as a crease or pleat, is to be inserted, imparting the necessary configuration, such as a crease or pleat, and maintaining it in this position whilst heat and pressure are applied.

A further method for flat-setting and shrinkproofing keratinous fabrics comprises treating the fabric with a setting agent and setting it in a flat configuration by heating the fabric while wet, impregnating it with an aqueous emulsion or dispersion of the polysulphide, and catalyst if required, drying the fabric, and curing the polysulphide. Finally the fabric is made into garments, and creases or pleats set therein if desired by steaming in the presence of a setting agent such as monoethanolamine sesquisulphite.

The setting of the fabric, whether carried out before or after treatment with the polysulphide, may be effected using any of the known methods, for example by means of setting agents, e.g. reducing agents, bases, water, and superheated steam. Monoethanolamine sesquisulphite is the most frequently used setting agent and may be used in association with a swelling agent, e.g. urea.

The compositions used in the process of this invention may contain antisoiling, antistatic, bacteriostatic, rotproofing, flameproofing and wetting agents. They may also contain water-repellents such as paraffin wax, and fluorescent brightening agents.

The invention will now be illustrated to the following Examples. Unless otherwise specified, parts and percentages are by weight. References to various standard tests are made: the nature of these tests is as follows.

TEST PROCEDURES EMPLOYED IN THE EXAMPLES

Standard Wash I

Prior to measurement of surface smoothness and crease retention, the garment samples were washed for one hour in a Bendix MRE rotating drum, domestic washing machine in a phosphate buffer of pH 7 and at 40°C using a liquor/sample ratio of 22:1 by weight. The samples were removed and hydroextracted in a domestic spin dryer for one minute. After removal from the spin dryer the samples were sharply shaken three times and then allowed to hang until dry at room temperature. Creased and pleated garments were allowed to hang vertically.

Standard Wash II

The treated samples of cloth were washed at 40°C for 20 minutes in an English Electric Reversomatic washing machine, set on programme 5 with the timing control set on 1, in an aqueous solution containing, per litre, 2 g of soap flakes and 0.8 g of anhydrous sodium carbonate, using a liquor/sample ratio of about 30:1 by weight. The samples were rinsed in cold water, spun in the machine, and then dried for 30 minutes in a Parnall Tumble Drier on full heat.

Shrinkage

Shrinkage was measured as the difference in dimensions of the fabric before and after washing. Area shrinkage was calculated from linear shrinkage measurements.

Smooth Drying Index

Surface smoothness of the garment after the standard wash procedure was assessed by comparison with Monsanto three-dimensional plastic 'Wash-'n-Wear' standards. This comprises a series of five graded plastic panels having surface smoothness characteristics varying on a scale between one and five. The test panels are illuminated under oblique overhead lighting conditions (angle of incidence of lighting = 16°). A sample of material for assessment is illuminated under the same conditions, and its surface smoothness assessed by comparison with the test panels. The grade numbered five corresponds to negligible or no change in the appearance of the sample after washing.

Degree of Set

The crease retention of the garment after the standard wash procedure is measured on an apparatus described in the Journal of the Textile Institute, 1962, 53, 143. In this equipment, the creased sample is mounted at the centre of rotation of a light source which is in the form of a slit, the plane of rotation being at right angles to the crease, and the slit being parallel to the crease. The light source is rotated until the shadow formed by the crease just disappears, and the angle of incident light under this condition is measured. The fabric is then rotated until the shadow formed at the other side of the crease also just disappears, and the incident angle measured. The degree of crease set is then calculated as:

Percentage set = (mean incident angle)/90 × 100.

On this basis, the sharper the crease measured, the higher is the value of the set obtained.

EXAMPLE I

This example illustrates the use of a polysulphide resin to impart shrink-resistance to a wool grey twill fabric. No catalyst for the resin was used.

The polysulphide used was "Thiokol LP-33" which according to the manufacturers has an average molecular weight of 1000, a viscosity at 27°C of 1400–1650 centipoises and percentage cross-linking of 0.5%. The structure is that represented below:

$$HS(C_2H_4OCH_2OC_2H_4SS)_6 \; C_2H_4OCH_2OC_2H_4SH$$

Samples of the fabric were padded with a 3% solution of the polysulphide in perchloroethylene to give 100% pick-up and dried. The samples were stored under ambient conditions and the area shrinkage was tested periodically after treatment according to Standard Wash I. The results are given below:

| Storage Time | Area Shrinkage |
| --- | --- |
| 0 | 16.8% |
| 1 day | 10.1% |
| 8 days | 9.6% |
| 18 days | 9.3% |
| Untreated | 18.0% |

EXAMPLE II

In this example, monoethanolamine was used as catalyst in the treatment of wool to impart shrink-resistance.

The polysulphide used was "Thiokol LP-2". According to the manufacturers its average molecular weight is about 4000, and it is prepared in the presence of 2 mole % of a trichloropropane as cross-linking agent. It may be represented by the formula $$HS(C_2H_4OCH_2OC_2H_4SS)_{23} \; C_2H_4OCH_2OC_2H_4SH$$

The cloth used was a wool flannel of approximately 170 g per square metre; the pH of its aqueous extract was 3.1. The flannel was padded with a 3% solution of "Thiokol LP-2" in trichloroethylene, containing 10% of monoethanolamine based on the weight of the polysulphide, and 5% of absolute ethanol based on the total solution weight, such that the uptake of the polysulphide was 8% and that of monoethanolamine was correspondingly 0.8%. Then the flannel was dried at 50°C in a fanned oven. The samples were examined periodically for shrinkage after treating according to Standard Wash II. A sample of flannel was also subjected to this severe washing but without prior treatment with "Thiokol LP-2".

| | Area Shrinkage (%) after (days) | | | |
| --- | --- | --- | --- | --- |
| | 1 | 4 | 8 | 14 |
| Untreated | 22.5 | 23.5 | 22.2 | 21.7 |
| Treated with "Thiokol LP-2" | 23.5 | 15.1 | 11.8 | 7.5 |

EXAMPLE III

This example illustrates the use of a mixture of a polysulphide resin and a polyisocyanate prepolymer to impart shrink-resistance to wool grey twill fabric.

The polysulphide used was "Thiokol LP-33" described in Example I and the polyisocyanate prepolymer was "Synthappret-LKF" available from Bayer. A 2% solution was made up in perchloroethylene, containing equal weights of polysulphide and polyisocyanate.

Samples of the fabric were padded through the resin solution to a 100% pick-up, then tumble dried. The samples were stored under ambient conditions and the area shrinkage and smooth drying properties measured periodically after treatment according to Standard Wash I. The results are given below:

| Storage Time (days) | Area Shrinkage (%) | Smooth Drying Index |
| --- | --- | --- |
| 0 | 14.0 | 1 |
| 1 | 0.5 | 4 |
| 3 | 2.8 | 3 |
| 6 | 2.3 | 3 |
| Untreated | 18.0 | 1 |

EXAMPLE IV

This example illustrates the use of a polysulphide to impart shrink-resistance and durable press characteristics to a wool grey twill fabric. In this example calcium naphthenate was used to catalyse curing of the resin.

The polysulphide used was "Thiokol LP-3" which according to the manufacturers had an average molecular weight of 1000, a viscosity at 27°C of 700–1200 centipoises and percentage cross-linking of 2.0%. The structure is that represented below:

$$HS—(C_2H_4OCH_2OC_2H_4SS)_6 \; C_2H_4OCH_2OC_2H_4SH$$

Samples of the fabric were padded with a 4% aqueous solution of monoethanolamine sesquisulphite (70%) to about 50% pick-up and a crease placed in the samples using a Hoffman Press: the cycle was 30 seconds steam (head locked), 30 seconds press with steam (head locked), 10 seconds vacuum.

The creased fabric was padded with a solution in perchloroethylene containing 2% of the polysulphide and 0.4% of calcium naphthenate to 100% pick-up and then tumble dried. The dried samples were stored under ambient conditions and the area shrinkage, percentage crease set and smooth drying index values measured periodically after treatment according to Standard Wash I.

| Storage Time (days) | Crease Set (%) | Smooth Drying Index | Area Shrinkage (%) |
| --- | --- | --- | --- |
| 0 | F | F | 12.3 |
| 8 | 43 | 3 | 6.9 |
| 12 | 71 | 5 | 1.2 |
| 15 | 83 | 5 | 0.0 |
| Untreated control | F | F | 18.0 |

In the table above "F" indicates that severe felting occurred and that no measure of percentage crease set or smooth drying index could be made.

It was found that the curing time could be reduced considerably if the samples were heated, e.g. to 100°C. Under these circumstances an area shrinkage of only 1.5% could be achieved after 5 minutes heating at 100°C.

EXAMPLE V

This example illustrates the use of a polysulphide resin to impart shrink-resistance and durable press characteristics to a wool grey twill fabric using an ammonia atmosphere to catalyse the resin.

The procedure given in Example IV was substantially followed except that a 3% by weight solution of the resin was used. The results are as follows:

|  | Area Shrinkage (%) | Crease Set (%) | Smooth Drying Index |
|---|---|---|---|
| Thiokol LP-3 | 0.5 | 88 | 4 – 5 |
| Thiokol LP-33 | 0.8 | 95 | 5 |
| Untreated | 18.0 | F | F |

EXAMPLE VI

Example II was repeated, using, however, as the polysulphide "Thiokol LP-32". In this and succeeding Examples, the flannel employed was of the same weight as that used in Example II but the pH of its aqueous extract was 7. According to the manufacturers the average molecular weight of "Thiokol LP-32" is about 4000, and it is prepared in the presence of 0.5 mole % of a trichloropropane as cross-linking agent; it may be substantially represented by the formula

HS $(C_2H_4OCH_2OC_2H_4SS)_{23}$ $C_2H_4OCH_2OC_2H_4SH$.

Flannel, on being washed (according to Standard Wash II) after storage at room temperature for nineteen days with free access to air, shrunk in area by 14.7%, whereas untreated flannel shrunk by 21.7%.

In other experiments, "Thiokol LP-2", "LP-3", or "LP-32" were applied with diethylenetriamine as catalyst and/or simultaneously with a correactant.

DETA = diethylenetriamine
PETTG = pentaerythritol tetrakis(thioglycollate)
PPGBTG = bis(thioglycollate) of a polyoxypropylene glycol, average molecular weight 2000
BADGE = diglycidyl ether of bisphenol A (i.e. of 2,2-bis(4-hydroxyphenyl)propane) having a 1,2-epoxide content of 5.0–5.2 equiv./kg.

EXAMPLE VII

The flannel was padded with 1% solutions of "Thiokol LP-2" in trichloroethylene containing various catalysts, and the pick-up was adjusted so that the uptake of the "Thiokol" was 3%. In other experiments, the solution employed contained 2.66% of "Thiokol LP-2" so the uptake of the "Thiokol", at the same pick-up, was 8%. Samples of the flannel were dried at 50°C in a fanned oven for minutes, and then examined periodically for shrinkage after being washed according to Standard Wash II.

The results are shown in the following Table.

| Uptake of "Thiokol" on cloth | Catalyst name | uptake on cloth | Area shrinkage (%) after (days) | | | |
|---|---|---|---|---|---|---|
| | | | 1 | 2 | 8 | 22 |
| 3% | N,N'-diethyl thiourea | 0.3% | 13.2 | 13.2 | 10.8 | 4.5 |
| 3% | dimethyl-thiuram disulphide | 0.3% | 16.4 | 15.5 | 15.5 | 12.2 |
| 8% | tetrabutyl-thiuram disulphide | 0.8% | 7.9 | 6.0 | 7.9 | 6.9 |
| 8% | 2-mercapto-benzothiazole | 0.8% | 15.0 | 14.5 | 7.4 | 7.9 |
| 8% | di-isopropyl xanthogen disulphide | 0.8% | 10.8 | 4.5 | | 6.9 |
| 8% | diethylene-triamine | 0.16% | 13.6 | | 11.7 | 5.5 |

EXAMPLE VIII

An emulsion was prepared by dissolving sodium carboxymethycellulose (0.5 g) in water (44.5 g) heated at 70° to 80°C, allowing the solution to cool, adding 50 g of "Thiokol LP-2" and 5 g of an anionic emulsifying agent, and stirring with a high-speed stirrer for 5 minutes. (The anionic emulsifying agent was an adduct of 1 mol. of a mixture of $C_{16}$—$C_{18}$ n-alkyl primary amines and 70 mol. of ethylene oxide.)

A 6 g portion of this emulsion was diluted with 144 g of water, and mixed with 0.06 g of diethylenetriamine, or with 0.3 g of N,N'-diethylthiourea, 0.3 g di-isopropyl xanthogen disulphide, or 0.3 g sodium dibutyldithiocarbamate. The diluted emulsion was padded on to wool flannel, so that the take-up of "Thiokol LP-2" was 3%, and that of diethylenetriamine and the other catalysts was 0.06 and 0.3% respectively. Results obtained after carrying out Standard Wash II were:

| "Thiokol" type | pick-up | Catalyst type | pick-up | Co-reactant type | pick-up | Area Shrinkage (%) after (days) | | | |
|---|---|---|---|---|---|---|---|---|---|
| | | | | | | 1 | 2 | 8 | 22 |
| LP-32 | 3% | DETA | 0.06% | — | — | 14.4 | 7.8 | | |
| LP-32 | 3% | DETA | 0.06% | PETTG | 1% | 15.0 | 13.5 | | |
| LP-3 | 3% | DETA | 0.06% | — | — | 15.5 | 11.6 | | |
| LP-3 | 2% | DETA | 0.06% | PPGBTG | 1% | 19.9 | 11.6 | | |
| LP-2 | 2% | DETA | 0.16% | — | — | 13.5 | 7.9 | | |
| LP-2 | 2% | — | — | BADGE | 1% | 16.3 | 13.5 | 12.1 | |
| LP-2 | 2% | DETA | 0.16% | BADGE | 1% | 13.5 | 14.0 | | |

| Catalyst | Area Shrinkage (%) after (days) | | |
| --- | --- | --- | --- |
| | 1 | 2 | 8 |
| diethylenetriamine | 6.5 | | |
| N,N'-diethylthiourea | 11.6 | 10.7 | 10.2 |
| di-isopropyl xanthogen disulphide | 8.8 | 7.8 | |
| sodium dibutyldithiocarbamate | 8.3 | | |

EXAMPLE IX

Wool flannel was flat-set by padding to 70% pick-up with an aqueous solution containing 20 g per litre of monoethanolamine and 29 g per litre of a 70% solution of monoethanolamine sesquisulphite in water, and steaming for 2½ minutes. Next, the diluted emulsion of "Thiokol LP-2", prepared as described in Example VIII, and containing 0.4 g per litre of diethylenetriamine, was padded on to 150% pick-up. The treated flannel was dried at 70°C for 15 minutes, steamed for 2½ minutes, and then stored with free access to the air. After the samples had been washed according to Standard Wash II their shrinkage was measured: the area shrinkage after storing for 1, 2, 8, and 22 days was, respectively, 10.7, 11.7, 6.9, and 3.0%.

In another experiment, wool flannel was simultaneously set and shrinkproofed by padding with an aqueous mixture containing, per litre, 62 g of the emulsion of "Thiokol LP-2" prepared in Example VIII, 3.1 g of monoethanolamine, and 29 g of 70% monoethanolamine sesquisulphite, so that the uptake of "Thiokol LP-2", monoethanolamine, and the sesquisulphite were respectively, 3, 0.3, and 1.4%, and inserting a crease by steaming wet. On being washed according to Standard Wash II, the flannel retained its crease. The area shrinkage, after storage for 1, 2, 8, and 22 days was, respectively, 15.3, 12.1, 10.2, and 7.9%. Untreated flannel did not retain its crease and had a shrinkage of about 22%. Flannel treated with monoethanolamine and monoethanolamine sesquisulphite only had similar shrinkage to untreated flannel and did not retain its crease as well as that treated with "Thiokol LP-2".

What is claimed is:

1. A process for rendering woolen fabrics shrink-resistant which comprises applying to said fabric 0.5 to 15% by weight of a polysulfide of the formula

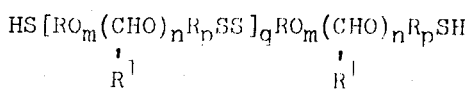

where R denotes an alkylene hydrocarbon group containing from 2 to 4 carbon atoms, $R^1$ denotes a radical selected from the group consisting of hydrogen, methyl and ethyl, $q$ is an integer which has an average value of at least 1, and is such that the polysulfide has an average molecular weight of at least 500 and at most 8000, and $m$, $n$ and $p$ are selected from the group consisting of zero and 1, with the proviso that $m$ and $p$ have identical values and when $m$ represents zero, $n$ also represents zero, and curing the polysulfide on the fabric.

2. Process according to claim 1, in which the polysulfide has an average molecular weight of at least 3000 and at most 5000.

3. Process according to claim 1, in which R denotes $-CH_2CH_2-$.

4. Process according to claim 1, in which $R^1$ denotes hydrogen.

5. Process according to claim 1, in which $m$, $n$ and $p$ each denote 1.

6. Process according to claim 1, in which the woolen fabric is heated to a temperature in the range 30° to 180°C to accelerate curing of the polysulfide.

7. Process according to claim 1, in which the woolen fabric is treated with the polysulfide at a pH of from 7.5 to 12.

8. Process according to claim 1, wherein a catalyst to accelerate the curing of the polysulfide is also applied, said catalyst being selected from the group consisting of bases, siccatives, oxidative curing agents, free-radical catalysts, sulphur, mercaptobenzothiazoles, dithiocarbamates, thiuram sulfides, thioureas, organic disulfides, alkyl xanthogen disulfides, and alkyl xanthates.

* * * * *